United States Patent
Väänänen et al.

(10) Patent No.: US 7,555,313 B2
(45) Date of Patent: Jun. 30, 2009

(54) METHOD FOR PROVIDING CONNECTIONS ON A PORTABLE DEVICE, A PORTABLE DEVICE

(75) Inventors: Jani Väänänen, Tampere (FI); Sami Pajusaari, Tampere (FI)

(73) Assignee: Nokia Corporation, Espoo (FI)

( * ) Notice: Subject to any disclaimer, the term of this patent is extended or adjusted under 35 U.S.C. 154(b) by 1121 days.

(21) Appl. No.: 10/377,956

(22) Filed: Feb. 28, 2003

(65) Prior Publication Data

US 2004/0185894 A1   Sep. 23, 2004

(51) Int. Cl.
*H04B 1/38* (2006.01)

(52) U.S. Cl. .................. 455/557; 455/556.1; 455/552.1; 455/41.1; 455/41.2

(58) Field of Classification Search ............. 455/557, 455/556, 552, 411, 41.2, 41.1
See application file for complete search history.

(56) References Cited

U.S. PATENT DOCUMENTS

| | | | | |
|---|---|---|---|---|
| 5,884,190 A | * | 3/1999 | Lintula et al. ............... | 455/557 |
| 7,065,367 B2 | * | 6/2006 | Michaelis et al. ........ | 455/452.2 |
| 7,126,985 B2 | * | 10/2006 | Horst et al. ................. | 375/222 |
| 7,142,882 B2 | * | 11/2006 | Schmidt .................. | 455/552.1 |
| 2004/0029613 A1 | * | 2/2004 | Kitazumi et al. ............ | 455/557 |
| 2004/0041902 A1 | * | 3/2004 | Washington ............. | 348/14.01 |

* cited by examiner

*Primary Examiner*—Sanh D Phu

(57) ABSTRACT

The invention relates to a method for providing connections on a portable device for different media types, the portable device comprising communication means for transferring data between the portable device and another device of a media type, wherein for each media type a media type specific media module is provided in the portable device, wherein communication between the media module and an application being executed in the portable device communicating with said another device is performed in a media independent manner, and messages of the application are converted to media type specific messages in the media module of the media type, and media type specific messages of the other device are converted to application messages in the media module of the media type. The invention also relates to other devices with communication performed in a media independent manner.

7 Claims, 3 Drawing Sheets

METHOD FOR PROVIDING CONNECTIONS ON A PORTABLE DEVICE, A PORTABLE DEVICE

A method for providing connections on a portable device, a portable device, and a wireless station

FIELD OF THE INVENTION

The present invention relates to a method for providing connections on a portable device for different media types, the portable device comprising communication means for transferring data between the portable device and another device of a media type. The invention also relates to a portable device comprising communication means for transferring data between the portable device and another device of a media type. Yet, the invention relates to a personal computer comprising communication means for transferring data between the portable device and another device of a media type. The invention further relates to a wireless station comprising communication means for transferring data between the portable device and another device of a media type. The invention also relates to a system comprising a portable device having communication means for transferring data between the portable device and another device of a media type.

BACKGROUND OF THE INVENTION

Portable devices are used widely for many different purposes. For example, laptop computers are used for tasks such as word processing, performing calculations, maintaining calendar information, printing information, sending and receiving e-mails, etc. For such purposes there are different kinds of applications (programs) installed on the portable device. When an application of the portable device needs to communicate with another device, e.g. a phone, a printer and/or a modem, the portable device is connected to the other device e.g. with a cable or with wireless means. In addition to that a software module is installed to the portable device for providing a suitable interface for the connection in question. Then, the software module can be used to perform necessary conversions between signals of the application and the other device. Not all the connections are of the same type. For example, a phone needs a different kind of communication than a modem. Therefore, the interface converts the messages sent from the application to messages and/or signals suitable for commanding the device in question. The interface also converts the incoming messages and/or signals to a form which is understandable by the application.

Nowadays, new mobile phones offer a lot more functionality than just the ability to talk. There are mobile phones which include calendar operations, word processing operations, calculation operations, etc. However, because of the limited size of the mobile phones they are not so easily operated as larger devices, e.g. laptop computers. Therefore, there is a need to connect mobile phones with another device for performing operations of the mobile phone by using the device connected to the mobile phone. Different connection types have been developed for such arrangements. There are, just a few to mention, wired connections by using e.g. RS-232, USB (Universal Serial Bus), and wireless connections by using optical signals (e.g. IrDA), inductive signals, and/or radio signals (e.g. Bluetooth™, WLAN). Each of these connection types have their own specifications. From the viewpoint of an application developer it is a demanding task to develop a proper interface for each of these connection types. In prior art the problem has been resolved by providing a certain media module in which all connection types to be supported by the media module have been taken into account. When a certain connection type has been taken into use, the media module has selected the proper interface which performs the necessary conversion operations between the application and the device in question. The media module is informed of the right connection type for the selection of the interface, for example, by the user of the portable device, or by some kind of handshaking procedure between the media module and the connected device.

One disadvantage with prior art systems is that there can only be one active connection at a time. So, if the user of the portable device would like to use two or more different connection types simultaneously, it would not be possible with prior art devices. A similar problem also exists with one device if it supports more than one communication protocol. Then, accordingly, the media module selects the correct protocol and performs necessary conversions between the portable device and the other device. However, only one communication stream can be active with prior art media modules.

SUMMARY OF THE INVENTION

It is an aim of the present invention to provide a method and a system for enabling simultaneous communication between a portable device and one or more external devices and/or communication protocols. The invention is based on the idea of using a separate media module for each different kind of medium. If multiple protocols can be used, all the protocols can be supported by the same media module, for example, by providing a different communication stream for each communication protocol supported by the media module. The different media modules have substantially similar application interfaces, wherein from the application programmer's point of view and the user's point of view all the media modules look like the same. The necessary conversions between applications and the devices will be performed by the media modules. Preferably, at least two interfaces are provided in the media modules: one interface for controlling a media module and requesting device information and another interface for data transfer. More precisely, the method according to the present invention is primarily characterized in that for each media type a media type specific media module is provided in the portable device, wherein communication between the media module and an application being executed in the portable device communicating with said another device is performed in a media independent manner, and messages of the application are converted to media type specific messages in the media module of the media type, and media type specific messages of the other device are converted to application messages in the media module of the media type. The portable device according to the present invention is primarily characterized in that the portable device comprises a media type specific media module for each media type, wherein communication between the media module and an application being executed in the portable device communicating with said another device is performed in a media independent manner, and the media module of the media type comprising means for converting messages of the application to media type specific messages, and means for converting media type specific messages of the other device to application messages. The personal computer according to the present invention is primarily characterized in that the system comprises a media type specific media module for each media type, wherein communication between the media module and an application being executed in the personal computer communicating with said another device is performed in a media independent manner, and the media module of the media type comprising means for converting messages of the application to media type specific messages, and means for converting media type specific messages of the other device to application messages. The wireless station according to the present invention is primarily characterized in that the wireless station comprises a media type specific media module for each media type, wherein communication between the media module and an application being executed in the wireless station communicating with said another device is performed in a media independent manner, and the media module of the media type comprising means for converting messages of the application to media type specific messages, and means for converting media type specific messages of the other device to application messages. The system according to the present invention is primarily characterized in that the system comprises a media type specific media module for each media type, wherein communication between the media module and an application being executed in the portable device communicating with said another device is performed in a media independent manner, and the media module of the media type comprising means for converting messages of the application to media type specific messages, and means for converting media type specific messages of the other device to application messages.

The present invention shows remarkable advantages over solutions of prior art. When applying the method of the invention, a multiple of connections can simultaneously be active between the portable device and other devices connected to it. It is also possible to have more than one active communication stream using either the same or different communication protocols. The different communication streams can use the same device or separate devices. It is then possible to use such applications in the portable device which simultaneously need more than one connection.

With an advantageous embodiment of the present invention in which a mobile phone is connected with a personal computer (PC) the user of the PC can utilize different functionalities of the mobile phone thru the PC.

BRIEF DESCRIPTION OF THE DRAWINGS

In the following, the invention will be described in more detail with reference to the appended drawings, in which.

DETAILED DESCRIPTION OF THE INVENTION

Figure 1:
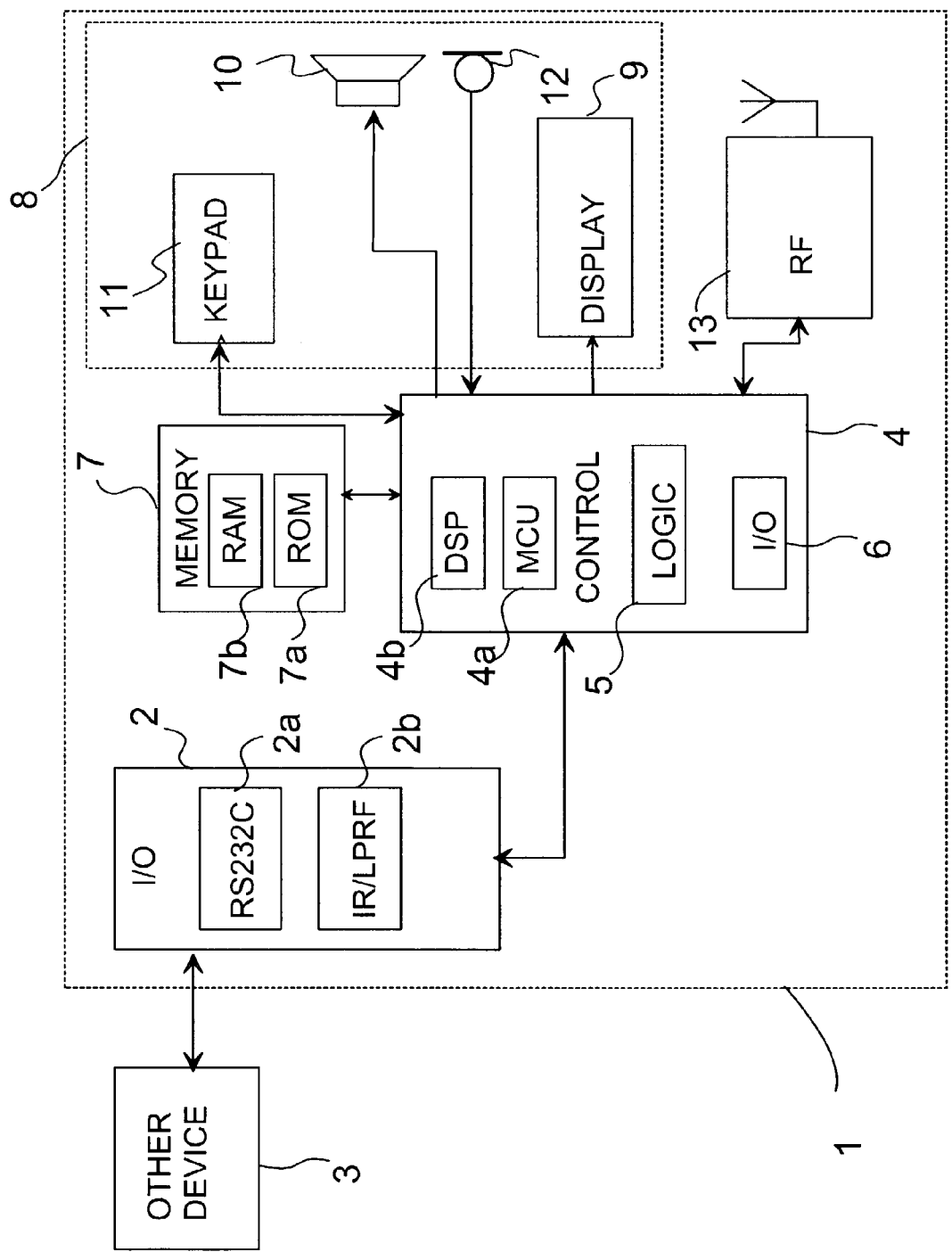
FIG. 1 shows an electronic device according to a preferred embodiment of the invention in a reduced block chart.

The following detailed description of the invention presents, as an example, a portable device 1 as shown in FIG. 1, comprising communication means 2 for communicating with at least one other device 3. The portable device 1 also comprises a control block 4 with at least one processor, such as a micro controller unit 4*a* (MCU), and possibly also a digital signal processing unit 4*b* (DSP). The control block also comprises logic functions 5 as well as access logic 6 (Input/Output, IO), e.g. for communication between other functional units of the device and the control block 4. Furthermore, the portable device 1 comprises a memory 7 which preferably contains at least a read only memory (ROM) 7*a* and a random access memory (RAM) 7*b*. The read only memory 7*a* can also be, either completely or in part, implemented by means of a non-volatile random-access memory, such as EEPROM or FLASH. The read only memory 7*a* is intended for the storage of e.g. control software, application software, permanent data and the like in the portable device 1. The random access memory 7*b* can be used, for example, for the storage of changeable information required during the use of the portable device 1. In this preferred embodiment, a part of the random access memory is implemented by using a non-volatile random access memory, wherein it is possible to store in this memory, for example, information which does not need to be changed often, e.g. user profile data, telephone directory data, calendar data, etc. The user interface 8 of the portable device 1 comprises means for presenting data, such as a display 9 and an earpiece/speaker 10, as well as means for entering data, such as one or more keyboards 11 and a microphone 12. The portable device 1 is, for example, a laptop PC, a Personal Digital assistant (PDA), or a palmtop computer. However, it should be mentioned that the present invention can also be applied in other portable devices than those mentioned above.

In an advantageous embodiment of the portable device 1 the communication means 2 comprise wired communication means 2*a*, e.g. RS 232C type of connection, and/or short range wireless communication means 2*b*, e.g. low power radio transmitter/receiver such as Bluetooth™ compatible transmitter/receiver, and/or optical transmission means such as IrDA compatible transmitter/receiver.

Figure 2A:
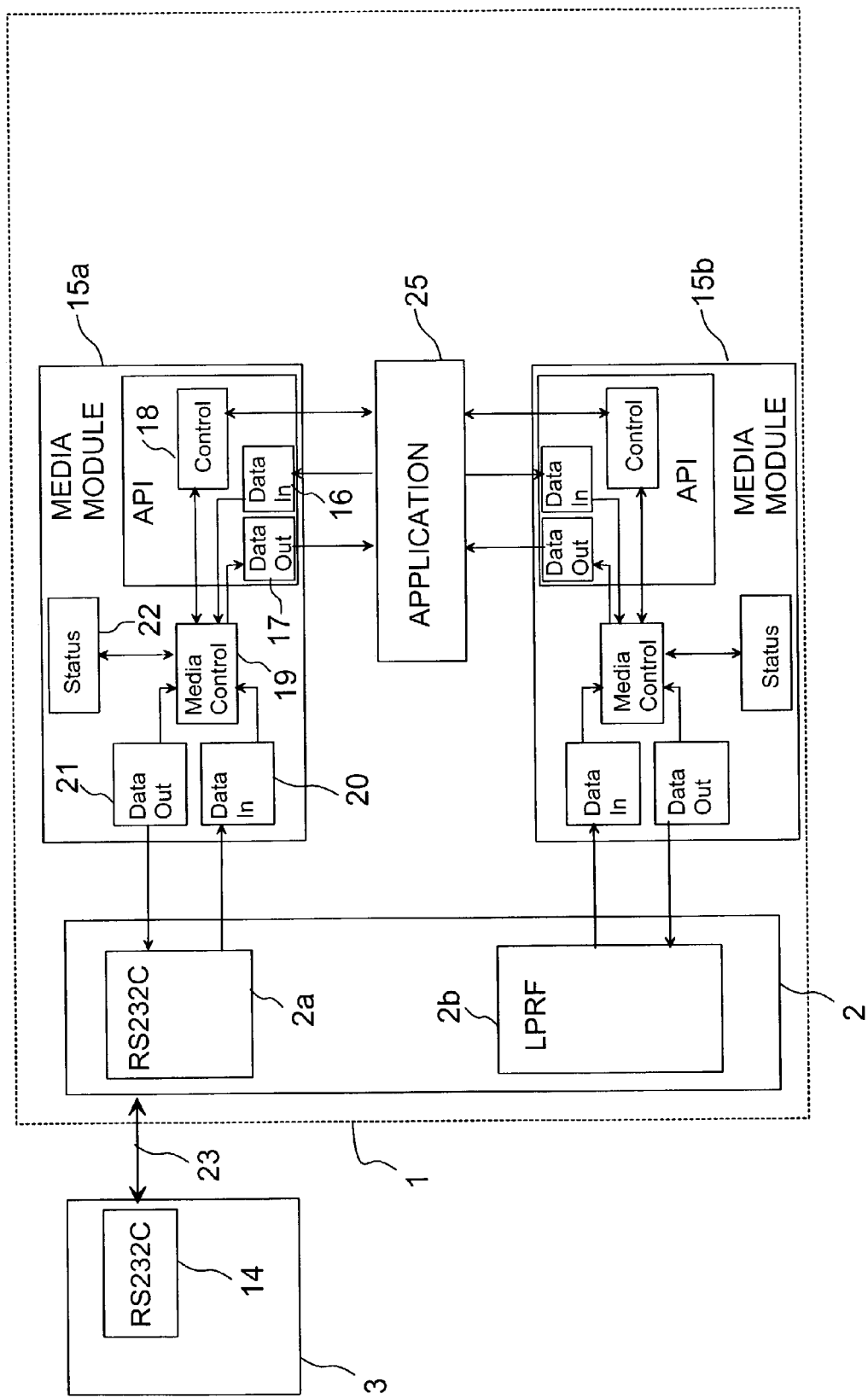
FIGS. 2*a* and 2*b* illustrate example situations, in which the present invention can be utilized.

In the system of the present invention as shown in FIG. 2*a*, one media module 15*a*, 15*b* is provided for each connection type. The above mentioned connection types RS 232C, Bluetooth.™., IrDA are just a few non-limiting examples of the connection types with which the present invention can be applied. The main tasks of the media modules are to provide media independent interface for applications and to handle medium specific tasks on behalf of the applications. Said medium independent interface provided in all the media modules 15*a*, 15*b* is arranged for exchanging information with applications. The format of the interface is preferably substantially similar in all the media modules 15*a*, 15*b*. This makes it easier for the application designer/programmer to define the messages to be used by the application in communication with the media modules 15*a*, 15*b*. This kind of interface is called as an application programming interface API in this description of the invention. In an advantageous embodiment of the present invention the API is realized in media modules as data ports 16, 17 and a control port 18 (FIG. 2*a*). The data port comprise an application input port 16 for receiving data from applications 25 and an application output port 17 for transmitting data to applications 25. The control port 18 is used to receive commands from applications and send status information to applications. The control port 18 handles necessary operations to open and close a medium, reserve and release resources (e.g. memory space) of the portable device for a connection, etc.

In addition to the API media modules further comprise other control means and data delivery means. The other control means include a media control block 19 which examines status information and/or messages received from the wired communication means 2*a* and deducts, what action(s) to take due to the message(s). Preferably, the media modules further comprise a medium input port 20 for receiving messages from the wired communication means 2*a* and a medium output port 21 for transmitting messages to the wired communication means 2*a*. There are also provided storing/retrieving means 22 for storing and retrieving information about the status of the media module and the media in question. The status information advantageously inform, whether the medium is active or not, if the medium is in suspended state, what kind of connections exists with the medium, an identifier of the medium, etc.

Neither the structure of the API nor the media modules are disclosed in more detail in this description but the expert in the field can realize them in practical implementations on the basis of the description.

FIG. 2a depicts as a functionality based diagram an example situation in which the present invention can be applied. In this situation the portable device 1 is connected to another device 3 for communication purposes. The other device 3 comprises e.g. wired communication means 14 supporting RS 232C type of communication. Therefore, the portable device 1 and the other device are connected with a cable 23. The devices 1, 3 are powered up (if not already) and set-up procedures are performed in both devices. During the communication set-up the portable device 1 activates one type dependent media module 15a, 15b for each medium type which the portable device supports. In this example the portable device supports a wired RS 232C type of connection and a wireless, low power radio connection. However, the present invention is not restricted to devices supporting only two medium types nor devices in which the supported medium types are the RS 232C type of connection and the low power radio connection.

The first media module 15a is activated preferably by starting to execute the appropriate program code from the memory 7 (FIG. 1). The program code comprises machine executable steps for performing necessary set-up procedures to set the wired communication means 2a into a state which enables the communication thru the wired communication means 2a and the cable 23 with the other device 3. The user of the portable device 1 and/or the application can, for example, set the communication mode, speed, number of bits/character, etc. for the connection. The media module then commands the wired communication means 2a accordingly. The user can also select that she/he wishes to use a printer with an application for printing information. The application can be, for example, a word processor. When the user selects a printing command, the application begins to activate a printer. Let us suppose that the printer is connected to the wired communication means 2a, i.e. the other device 3 is the printer in this situation. Therefore, the application sends data to the first media module 15a of the wired communication means 2a. A handshaking procedure can be performed by the first media module 15a with the application to activate the connection and to inform the application about the status of the printer. If the status of the printer indicates that it is ready to receive information for printing, the application begins to send information to the first media module 15a. The first media module 15a converts the received information into format which is suitable for transmitting it to the wired communication means 2a. The wired communication means 2a transforms the information into electrical signals, which are sent to the printer via the cable 23. The printer receives the information and begins to print it. If the printer can not receive more information, for example when an input buffer of the printer is full or almost full, the printer can send signal(s) to the wired communication means 2a indicating that the transmission should be suspended. The first media module 15a examines the received signaling and deducts, what actions to take. In this example situation the first media module 15a can send e.g. a status message to the application to suspend the transmission of information. However, it is also possible that a buffering operation is provided in the first media module 15a, wherein the first media module 15a can still receive information from the application, but suspends the transmission of the information to the wired communication means 2a, until the printer notifies that it is again ready for receiving further information.

Figure 2B:
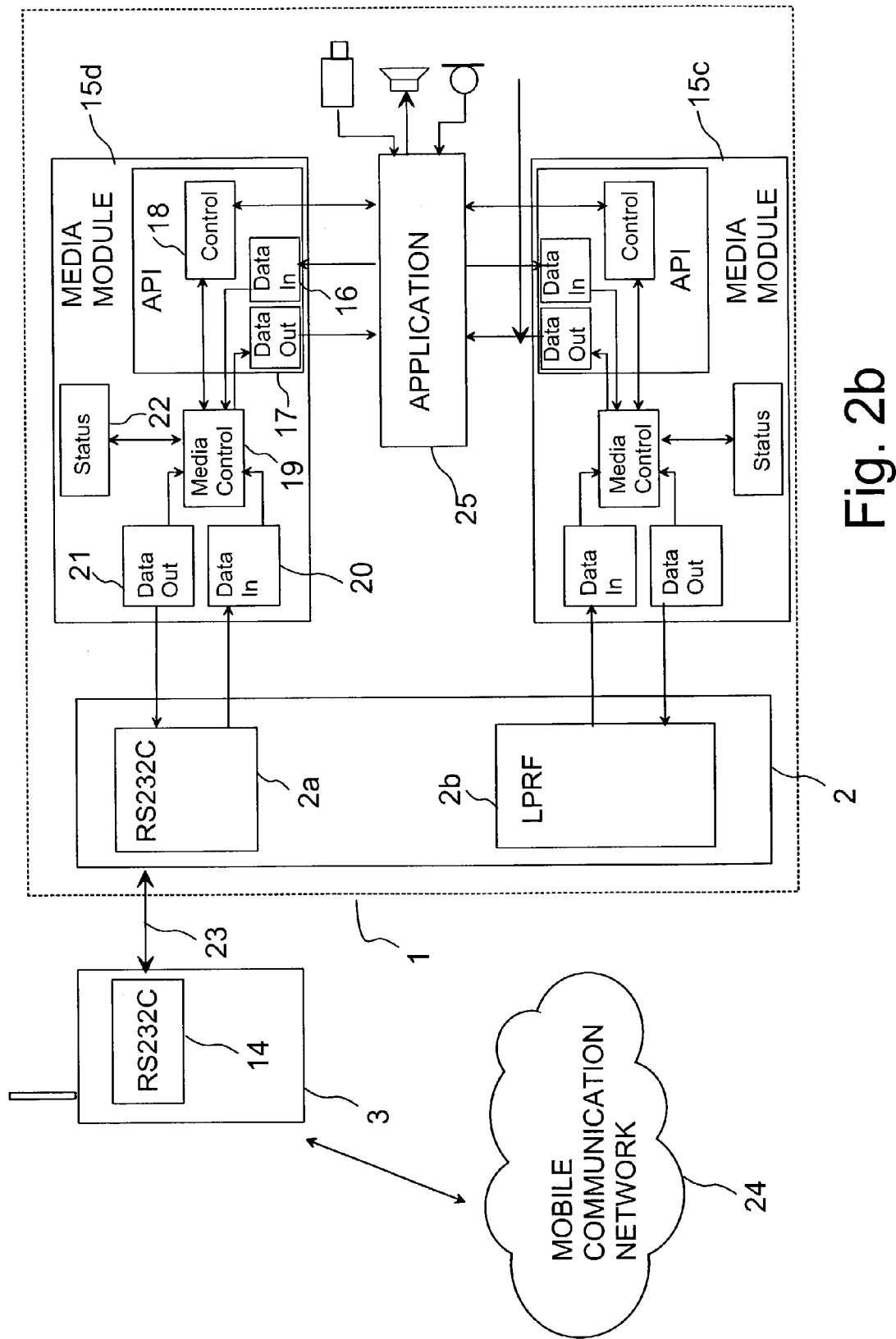

In the above described situation in which the application needs services of a medium, e.g. a phone, preferably the following steps are performed in an advantageous method of the present invention. The application and the media module corresponding to the requested media type perform the handshaking procedure, in which the application sends to the API of the media module a message to ask the status of the media module. The media module starts to poll devices of that media type, for example, phones. Such a device then signals the status of the device to the media module, wherein the media module sends the status information further to the application in a format which is defined for the API and is substantially independent of the type of the medium. The media module also sends information of the connection types which the media module supports. If more than one device responded to the media module, the application or the user of the portable device can select from the devices which one to use. After the selection the application sends an open request message to the media module. The media module performs necessary steps to open (activate, attach) the selected medium, reserves (allocates) necessary resources from the portable device 1, and sets up a communication stream for the application. The allocated resources are, for example, an area of the memory 7 and the communication means 2a, 2b. The communication stream may have parameters selected according to specifications defined by the application, or default values may have been selected. When the activation steps are performed, the application and the selected device can begin to communicate. The application sends data to the data port of the API of the media module. The data is converted by the media module into correct form and sent via e.g. the wired communication means 2a to the device, e.g. to the device 3 of FIG. 2b.

When the application does not need the connection anymore, it will send a close (deactivate, detach) request message to the media module. Hence, the media module releases the resources allocated for the connection and removes the connection stream.

In the above it was mentioned that the media module corresponding to a media type performs polling of devices of that media type. It is also possible that the media module registers itself to an operating system executed in the portable device. The operating system can determine the status of the devices and if new devices are connected to the portable device. The operating system then notifies the media module of the status and changes in the status of the devices when necessary. It is also possible that more than one different method is used when controlling and informing the status of different devices. The method used may depend on the media type of the device. For example, both the above mentioned principles can be used in some implementations, wherein some devices are controlled by media module-based polling and some other devices are controlled by the operating system.

The above described principles are applicable to other medium types than phones, too. However, different media types may have different properties, wherein the media module of the particular media type performs medium and/or device specific tasks and hides them from the application.

It is also possible that an application needs more than one active connection simultaneously. In a system of FIG. 2b, a video conferencing application is running on the portable device 1 and needs one connection for transmission of speech and another connection for transmission of video information. In this case the media types are not similar wherein the application sends at least two messages, one of which is sent to a media module responsible for speech media and the other message to another media module responsible for video media. The portable device is connected to the external device 3, which in this embodiment is a mobile phone. The physical connection between the portable device 1 and the other device 3 can be any suitable connection type (wired/optical/radio/inductive/acoustic). Also more than one connection type can be used. Communication networks exist in which two or more different kinds of connections are available. For example, modern GSM communication network supports circuit switched connection (CS), high speed circuit switched data connection (HS-CSD) and even packet switched connection (GPRS). The circuit switched connection is mainly intended for transmission of speech, and the other two are mainly intended for data transmission. Therefore, the application may first send identification request message to one or more media modules, which then send identification information and, possibly, status information to the application. The application can deduce on the basis of the received information which kind of media modules are available in the portable device 1. The application selects the most appropriate ones for each connection. For example, the application can select a media module 15c of speech type for the transmission of speech and the media module 15d of video type for the transmission of video information. As was described above the application sends an open request message to the selected media modules 15c, 15d which perform the necessary steps of activating the device or media, setting up certain parameters, and activating a communication stream for each of the connections. The media module 15c of speech type selects advantageously the circuit switched connection as the media for the speech transmission. The media module 15c signals the other device 3 to communicate with a mobile communication network 24 to establish a circuit switched connection for the speech. Respectively, the media module 15d of video type selects either the high speed circuit switched data connection or the packet data connection for transmission of video. For that purpose, the media module 15d of the video type signals the other device 3 to establish a connection for video transmission using the selected data connection. After the establishment of the necessary connections the application can communicate with the mobile communication network 24, if no significant errors occurred during the establishment. If, however, some or all of the connections could not be established, the media module(s) inform the application respectively.

As was shown above, it is also possible to use more than one connection between the portable device 1 and the other device 3 simultaneously by using the present invention. The connections can utilize different connection types and/or protocols wherein different media modules are used for each media type.

In an advantageous embodiment of the present invention a unique identifier is defined for each device 3 connected to the portable device 1. The definition of the identifiers is advantageously performed as follows. Every media type supported by the portable device 1 is provided with a unique media type identifier. The length of the identifiers may be different in different embodiments, but in the following it is assumed that 16 bits (one word) are reserved for the identifier. One part of the identifier is reserved for indication of the media type and another part of the identifier is reserved for indication of the device 3. In the following non-restrictive example 8 most significant bits (the highest byte) of the identifier are reserved for indication of the media type and 8 least significant bits (the lowest byte) are reserved for indication of the device. For example, if there are three different kind of media types supported (i.e. three different media modules), the first media type can be identified with a first identifier 0x01 (the notation 0x indicates that the number is a hexadecimal number), the second media type is indicated with a second identifier 0x02, and the third media type is indicated with a third identifier 0x03. When a device is attached to the portable device 1 and one or more media modules are activated for the attached device, each activated media module sets the lowest byte of the identifier to a value which is not yet reserved. If the first media module has only one device active at the moment, the value is for example 0x01. Therefore the identifier gets a value 0x0101 for the first media module. If also the second media module is activated for the same device and the second media module is only activated for that device, the identifier for the device is for example 0x0201 for the second media module. If another device needing services of e.g. the second and third media module is connected to the portable device the identifier of that device would be defined as 0x0202 for the second media module and 0x0301 for the third media module (if there are no other devices for which the third media module is activated at the moment). By utilizing the principles above it is possible to derive a locally unique identifier for each device and for each media module the device is using. Different portable devices could still use same identifiers for devices connected to them because the identifiers are not transmitted between different portable devices. It is also not necessary to give a globally unique identifier for the devices.

A reserved identifier is released when the device 3 is disconnected from the portable device 1. This released identifier can then be used for identifying another device which will be connected to the portable device 1 at a later stage.

The present invention is not limited to the applications shown above. For example, the portable device can be a laptop PC, a wireless communication device such as mobile phone, etc. Also the other device can be a wireless communication device, a laptop PC, a printer, a camera, a scanner, etc. The invention can also be applied in systems in which two or more devices are connected to the portable device 1.

It is also possible that the portable device 1 comprises mobile communication means 13 (FIG. 1) for performing mobile station functions. Mobile communication means 13 comprise, for example, a transmitter and a receiver (not shown), by means of which the portable device 1 can communicate with the mobile communication network in a way known as such.

The API can be implemented with different protocols, for example utilizing OBEX, Phonet, SyncML and/or FileTransfer known as such.

The functions according to the invention can be largely implemented in the application software of the processor and/or digital signal processing unit. In the storage of some permanent setting values, it is possible to use the read only memory 7a and/or the non-volatile random access memory, which is known as such.

It should be evident that the present invention is not limited solely to the above-presented embodiments, but it can be modified within the scope of the appended claims.

The invention claimed is:

1. A method for providing connections on a portable device for different connection types, the portable device comprising communication modules for transferring data between the portable device and another device, wherein for each connection type a connection type specific media module is provided in the portable device, wherein communication between the media module and an application being executed in the portable device communicating with said another device is performed in a connection independent manner, and messages of the application are converted to connection type specific messages in the media module of the connection type, and connection type specific messages of the other device are converted to application messages in the media module of the connection type wherein a connection independent application programming interface for applications is provided in the portable device, wherein medium specific tasks are handled by the connection independent application programming interface on behalf of the applications, wherein the connection independent interface opens and closes a medium for communication between the portable device and the other device, and reserves and releases resources of the portable device for the communication connection.

2. A method for providing connections on a portable device for different connection types, the portable device comprising communication modules for transferring data between the portable device and another device, wherein for each connection type a connection type specific media module is provided in the portable device, wherein communication between the media module and an application being executed in the portable device communicating with said another device is performed in a connection independent manner, and messages of the application are converted to connection type specific messages in the media module of the connection type, and connection type specific messages of the other device are converted to application messages in the media module of the connection type, wherein the media module performs a polling operations to examine which devices corresponding to the connection type of the media module are connected to the portable device.

3. A method for providing connections on a portable device for different connection types, the portable device comprising communication modules for transferring data between the portable device and another device, wherein for each connection type a connection type specific media module is provided in the portable device, wherein communication between the media module and an application being executed in the portable device communicating with said another device is performed in a connection independent manner, and messages of the application are converted to connection type specific messages in the media module of the connection type, and connection type specific messages of the other device are converted to application messages in the media module of the connection type, wherein an operating system is executed in the portable device, the operating system determines the status of said another device, and notifies the media module of the status and changes in the status of said another device when necessary.

4. A portable device comprising communication modules for transferring data between the portable device and another device, a connection type specific media module for each connection type, wherein communication between the media module and an application being executed in the portable device communicating with said another device is performed in a connection independent manner, and the media module of the connection type comprising a control for converting messages of the application to connection type specific messages, and for converting connection type specific messages of the other device to application messages wherein the media module comprises a connection independent application programming interface for exchanging information with applications and for handling medium specific tasks on behalf of the applications, wherein the connection independent application programming interface comprises an application input port for receiving data from applications, an application output port for transmitting data to applications, and a control port for receiving commands from applications and for sending status information to applications.

5. A portable device comprising communication modules for transferring data between the portable device and another device, a connection type specific media module for each connection type, wherein communication between the media module and an application being executed in the portable device communicating with said another device is performed in a connection independent manner, and the media module of the connection type comprising a control for converting messages of the application to connection type specific messages, and for converting connection type specific messages of the other device to application messages wherein the media module comprises a connection independent application programming interface for exchanging information with applications and for handling medium specific tasks on behalf of the applications, wherein the connection independent application programming interface comprises a media control block for examining status information of a corresponding communication module and messages received from the corresponding communication module.

6. The method of claim 1 wherein said communication between the media module and the application being executed in the portable device is performed in a connection independent manner by use of a medium independent interface to said application and a medium specific interface to the media module of the connection type.

7. The portable device of claim 4 wherein said communication between the media module and the application being executed in the portable device is performed in a connection independent manner by use of a medium independent interface to said application and a medium specific interface to the media module of the connection type.

* * * * *